US007817534B2

(12) United States Patent
Burbidge et al.

(10) Patent No.: US 7,817,534 B2
(45) Date of Patent: Oct. 19, 2010

(54) METHOD AND APPARATUS FOR INTERRUPTING A TRANSMISSION OF A MULTICAST SIGNAL

(75) Inventors: Richard C. Burbidge, Hook (GB); Ravi Kuchibhotla, Gurnee, IL (US); Padmaja Putcha, Gurnee, IL (US); Kenneth A. Stewart, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 1373 days.

(21) Appl. No.: 10/704,931

(22) Filed: Nov. 10, 2003

(65) Prior Publication Data

US 2005/0100037 A1  May 12, 2005

(51) Int. Cl.
 *H04H 20/71* (2008.01)
(52) U.S. Cl. .............. 370/212; 370/252; 370/312; 370/432
(58) Field of Classification Search ............... 370/312, 370/252, 235, 236, 432
 See application file for complete search history.

(56) References Cited

U.S. PATENT DOCUMENTS

| 6,349,210 | B1 * | 2/2002 | Li ........................ 455/450 |
| 6,459,690 | B1 * | 10/2002 | Le Strat et al. ............. 370/332 |
| 6,614,770 | B1 * | 9/2003 | Kayama et al. ............. 370/331 |
| 6,667,985 | B1 * | 12/2003 | Drummond-Murray ..... 370/415 |
| 6,804,528 | B1 * | 10/2004 | Laroia et al. ................ 455/503 |
| 6,816,465 | B1 * | 11/2004 | Barsoum et al. ............ 370/252 |
| 6,845,238 | B1 * | 1/2005 | Muller ....................... 455/436 |
| 6,853,842 | B1 * | 2/2005 | Wilson et al. ............... 455/423 |
| 6,940,824 | B2 * | 9/2005 | Shibutani .................... 370/252 |
| 6,973,081 | B1 * | 12/2005 | Patel .......................... 370/390 |
| 7,206,840 | B2 * | 4/2007 | Choi et al. .................. 709/225 |
| 2002/0004371 | A1 | 1/2002 | Montgolfier |
| 2002/0191631 | A1 * | 12/2002 | Couty ......................... 370/432 |
| 2003/0018773 | A1 * | 1/2003 | Beckmann et al. .......... 709/223 |
| 2003/0022683 | A1 * | 1/2003 | Beckmann et al. .......... 455/518 |
| 2003/0026240 | A1 * | 2/2003 | Eyuboglu et al. ............ 370/349 |

(Continued)

OTHER PUBLICATIONS

3rd Generation Partnership Project, 3rd Generation Partnership Project; Technical Specification Group Radio Access Network; Radio Resource Control (RRC); Protocol Specification (Release 5); Jan. 2004; p. 8.5.11; 3GPP Organizational Partners.

(Continued)

*Primary Examiner*—Kwang B Yao
*Assistant Examiner*—Nguyen Ngo
(74) *Attorney, Agent, or Firm*—Vedder Price P.C.

(57) ABSTRACT

A method and apparatus for interrupting a transmission of a multicast signal includes a common channel selector (106) coupled to a receiver (102) to receive common channel information (116) therefrom. A repetition value calculator (108) receives measurement occasion information (118) from the common channel selector (106) to calculate a repetition factor (120). A system frame number comparator (110) determines if a channel measurement occasion (128) should be performed based on the repetition factor (120), a common identifier (124) and a largest common channel transmission time interval (122). The method and apparatus further includes a measurement occasion generator (112) coupled to the system frame number comparator (110), wherein if a measurement occasion is to be performed, a measurement occasion command signal (126) is provided to the measurement occasion generator (112) and the measurement occasion generator generates the channel measurement occasion (128).

13 Claims, 7 Drawing Sheets

U.S. PATENT DOCUMENTS

| | | | |
|---|---|---|---|
| 2003/0039225 A1* | 2/2003 | Casati et al. | 370/328 |
| 2003/0117980 A1* | 6/2003 | Kim et al. | 370/332 |
| 2003/0169722 A1* | 9/2003 | Petrus et al. | 370/347 |
| 2003/0177215 A1* | 9/2003 | Sutherland et al. | 709/223 |
| 2004/0028405 A1* | 2/2004 | Unitt et al. | 398/32 |
| 2004/0085904 A1* | 5/2004 | Bordogna et al. | 370/236 |
| 2004/0117860 A1* | 6/2004 | Yi et al. | 725/147 |
| 2004/0184427 A1* | 9/2004 | Lynch et al. | 370/342 |
| 2005/0111415 A1* | 5/2005 | Soomro et al. | 370/338 |

OTHER PUBLICATIONS

European Search Report dated Sep. 17, 2007 for European Application No. EP04800571.4, pp. 1-3.

Chinese Office Action; Chinese Application No. 200480033051.9; dated Jul. 3, 2009; pp. 1-10.

* cited by examiner

METHOD AND APPARATUS FOR INTERRUPTING A TRANSMISSION OF A MULTICAST SIGNAL

FIELD OF THE INVENTION

The present invention relates generally to a mobile communication apparatus and method and more specifically to multicast signal transmission in a wireless network for serving a plurality of mobile communication devices.

BACKGROUND OF THE INVENTION

Typically a wireless network is configured to transmit on a number of common and dedicated channels. The common channels carry information for a plurality of mobile devices either simultaneously, as through a broadcast, or individually, through independent addressing means. Mobile devices may also be configured to receive a multicast or broadcast signal on a common channel, wherein the multicast or broadcast signal is a message signal generated by a central communication source, such as a computer server, and transmitted simultaneously to a plurality of mobile devices. If a multicast or broadcast service is required to re-transmit the multicast or broadcast information on an individual user basis or to a subset of users, this results in a loss of efficiency for the multicast or broadcast service.

In accordance with third generation partnership project (3GPP) standards, a Universal Mobile Telephoning System (UMTS) network allows operation in four different states in connected mode, CELL_DCH, CELL_FACH, CELL_PCH and URA_PCH. In the CELL_FACH state, the mobile monitors a common physical channel based on some pre-defined selection rules, identified by one or more channelisation codes. The network may map multiple common data channels onto the same common physical channel. The different common channels can be configured differently so as to provide different quality of transmission, typically for different services, over the same common physical channel.

The mobile device typically monitors one of the common channels on an assigned common physical channel. When in the CELL_FACH state, a mobile device is generally available to receive information across a common channel assigned by its network, but must periodically suspend reception of signals on the common physical channel associated with the common channel. These intervals where common physical channel reception is suspended are usually termed measurement occasions. During a measurement occasion, the communications device tunes its receiver to a different frequency for purposes such as measurement of other common physical channel frequencies within the same system or different system. When a measurement occasion occurs, the mobile device typically cannot receive incoming information on the currently allocated common physical channel, due to inherent limitations in receiving two physical channels differentiated in frequency.

Generally, a network seeks to evenly distribute the timing of measurement occasions within a coverage area. This aids in efficient usage of the common physical channels. A typical UTMS network knows the timing of the measurement occasions for the mobiles in a particular cell. Under current UMTS specification 3GPP TS 25.331, the network determines when these measurement occasions are to occur and does not transmit data directed to a particular mobile during the time intervals when that mobile should be in a measurement occasion.

Since different mobile devices will conduct measurement occasions at different times based on their individual identities, the network will not be able to reliably transmit a multicast transmission in an efficient manner that can be completely received by all subscribed mobile devices. Furthermore, if a multicast signal is transmitted on a separate common physical channel, the conventional common data channel may be underutilized and also messages may not be delivered to the mobile device if the mobile device chooses to receive the multicast transmission instead of the transmission destined for it on the conventional common data channels.

Thus, there is a potential conflict between when a mobile device can perform a measurement occasion and the reliable reception of a multicast or broadcast signal. Because each mobile device can perform its measurement occasion at different time intervals, or during different system frames, the multicast or broadcast signal may not be received by mobile devices performing a measurement occasion during a period when the multicast or broadcast is transmitted. Also, if the length of the multicast or broadcast signal is more than one system frame, this increases the number of mobile devices that cannot receive the complete multicast or broadcast signal. Thus, there is a desire to allocate measurement occasions of mobile stations within a coverage area to reduce their impact on multicast or broadcast service reliability and efficiency.

BRIEF DESCRIPTION OF THE DRAWINGS

The invention will be more readily understood with reference to the following drawings wherein.

DETAILED DESCRIPTION OF PREFERRED EMBODIMENTS

The method and apparatus for interrupting a transmission of a multicast signal uses a common identifier for the mobile devices within a coverage area that receive a particular multicast service. As used herein, the term "multicast" encompasses the term "broadcast." The common identifier indicates the time intervals where transmission of the multicast signal should be interrupted so the mobile devices can perform measurement occasions without missing portions of the multicast signal.

In one situation, a network configures multiple common data channels on a common physical channel. A common channel is set aside for multicast transmissions, referred to as a common multicast channel. Other common channels, referred to as conventional common data channels, are used for transmitting dedicated data, among other information, to a wireless mobile device. However, since both channels are mapped to the same common physical channel, any time the mobile device interrupts the conventional common data channel reception for a measurement occasion, the mobile device will also stop receiving the multicast transmission being transmitted on the multicast channel. Thus, one embodiment interrupts transmission of a multicast signal on a common multicast channel so that no information is missed when the mobile is performing a measurement occasion.

In another embodiment, the network further sub-divides the time intervals where the multicast signal is interrupted. The sub-time intervals are based on further sub-grouping of the mobile devices receiving the multicast transmission. In one embodiment, this further sub-grouping can be based on: the individual multicast service identity, in the case of multiple multicast transmissions being transmitted simultaneously to different mobile devices in the cell; a cell or UTRAN registration area specific unique identifier; and/or any other such identity allowing the network to sub-divide the mobile devices into groups.

A method and apparatus for interrupting a transmission of a multicast signal includes a common channel selector coupled to a receiver, such that the common channel selector receives channel information therefrom. The method and apparatus further includes a repetition value calculator receiving measurement occasion information from the common channel selector to calculate a transmission interruption time interval repetition factor. A system frame number comparator is coupled to the repetition value calculator and the common channel selector, wherein the system frame number comparator determines if a measurement occasion should be performed based on the repetition factor, a common identifier and a largest common channel transmission time interval. The method and apparatus further includes a measurement occasion generator coupled to the system frame number comparator, wherein if a measurement occasion is to be performed, a measurement occasion command signal is provided to the measurement occasion generator and the measurement occasion generator generates a channel measurement occasion.

Figure 1:
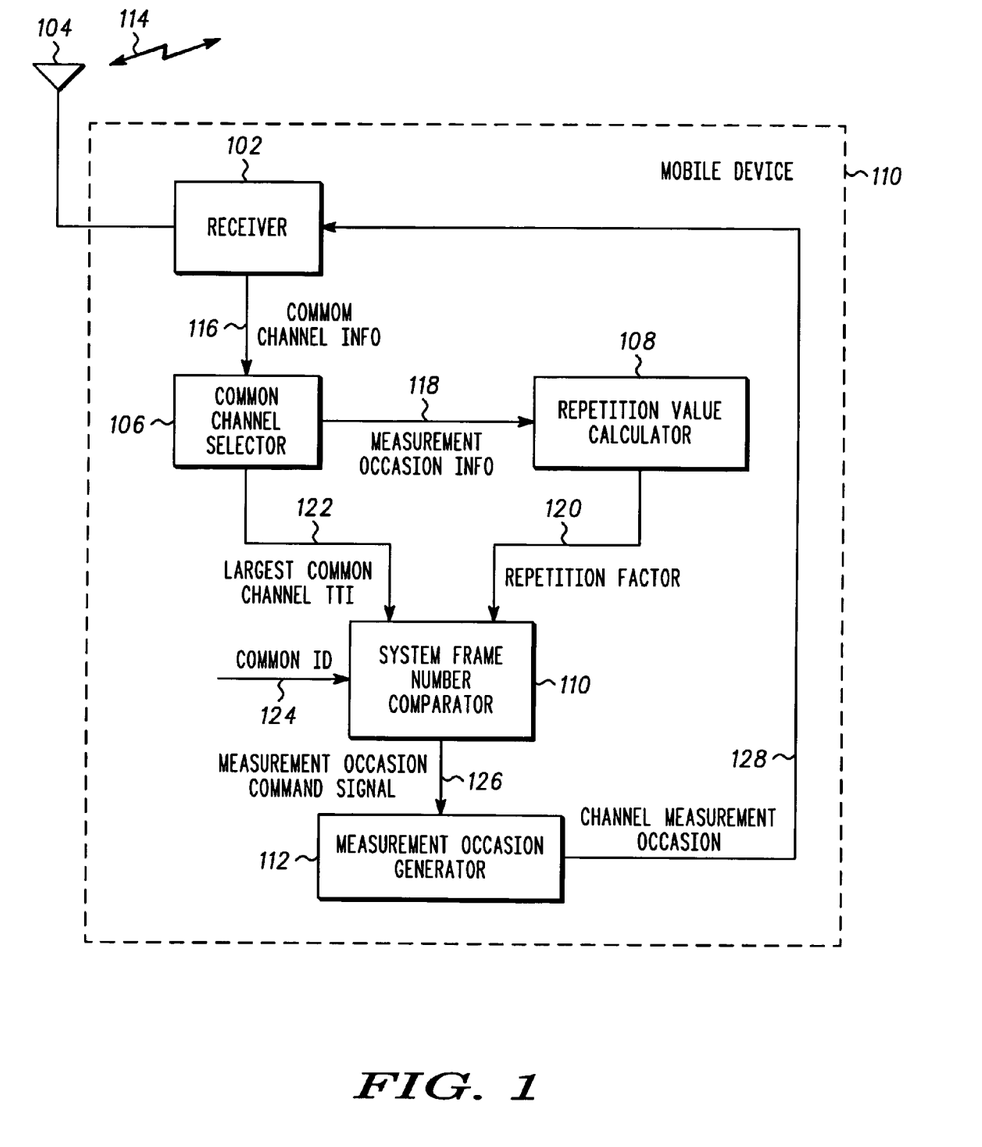
FIG. 1 illustrates a block diagram of a wireless mobile device according to one embodiment.

More specifically, FIG. 1 illustrates a wireless mobile device 100 including a receiver 102 having an antenna 104, a common channel selector 106, a repetition value calculator 108, a system frame number comparator 110 and a measurement occasion generator 112. These functional blocks may represent executable program instructions, individual processors, application specific integrated circuits, digital signal processors, microprocessors, firmware, micro-controllers, state machines, or any other recognized operational component or component capable of executing program instructions wherein the program instructions may be disposed on a ROM, RAM, EEPROM, compact disk, digital versatile disk, optical medium, or any other volatile or non-volatile storage medium. Examples of a wireless mobile device 100 are: a radio, a cellular telephone, a smart phone, a personal digital assistant with wireless transceiver, a personal computer with a wireless receiver, or any other suitable wireless device. Note that the receiver 102 will often be part of a transceiver in a communication device.

In one embodiment, the receiver 102 receives an incoming common physical channel signal 114 via the antenna 104. The receiver 102 provides common channel information 116 to the common channel selector 106. As discussed above, the common channel information 116 includes broadcast information, system parameter information, multicast transmissions, or any other suitable information as recognized by one having ordinary skill in the art.

The common channel selector 106 performs various operations including, but not limited to, the extraction of measurement occasion information 118 from the common channel information 116. The common channel selector is operative to also select one or more of the common channels on the incoming common physical channel. In one embodiment, the measurement occasion information 118 may be a common channel measurement occasion cycle length coefficient, commonly referenced as "k". The measurement occasion information 118 is provided to the repetition value calculator 108 such that the repetition value calculator 108 may calculate a repetition factor 120. In one embodiment, the repetition factor 120 may be the measurement occasion cycle length which is determined by the calculations of two to the power of the measurement occasion information, k.

The common channel selector 106 also determines from the common channel information 116 a largest common channel transmission time interval 122. The largest common channel transition time interval 122 represents the largest transmission time interval from amongst all of the common channels mapped onto the corresponding common physical channel from which the mobile device 100 receives the transmission 114. In one embodiment, the largest common channel transmission time interval 122 is represented as the factor N.

Within the mobile device 100, the system frame number comparator 110 receives the repetition factor 120 from the repetition value calculator 108, the largest common channel transmission time interval 122 from the common channel selector 106 and a common identifier 124. In one embodiment, the common identifier 124 is a radio network temporary identifier. The common identifier 124 is provided to the mobile device 100 through the receiver 102, and the common identifier 124 is provided prior to delivering a multicast service to the mobile device 100.

The system frame number comparator 110 determines if a measurement occasion should be performed. The system frame number comparator 110 calculates the timing of the measurement occasion using the repetition factor 120, the largest common channel transmission time interval 122 and the common identifier 124. The timing of the measurement occasion may be determined in accordance with known common channel measurement occasion calculations using the common ID 124 in lieu of a cell radio network temporary ID, such as a C_RNTI.

Based on a determination of the system frame number comparator 110, if it is determined that a measurement occasion may be performed, the system frame number comparator 110 generates a measurement occasion command signal 126, which is provided to the measurement occasion generator 112. The system frame number comparator 110 may determine, based on the common identifier, if a measurement occasion should be performed for any of multiple multicast services or for a single multicast service. The measurement occasion generator 112 thereupon generates a channel measurement occasion 128, in accordance with known channel measurement occasion procedures. Therefore, the mobile device 100 may interrupt the reception of a multicast signal during a time interval determined by the system frame number comparator 110 for the performance of channel measurement occasions 128.

Furthermore, the mobile device 100 may operate in accordance with a corresponding network (not shown) such that the mobile device 100 does not miss any multicast data provided across a multicast channel due to performing a channel measurement occasion 128. Moreover, as discussed in greater detail below, the mobile device 100 also determines, based on the comparison of the system frame number comparator 110, whether the mobile device 100 may read conventional common data channel data during a time interval designated by a network for interrupting transmission of data on the multicast channel.

Figure 2:
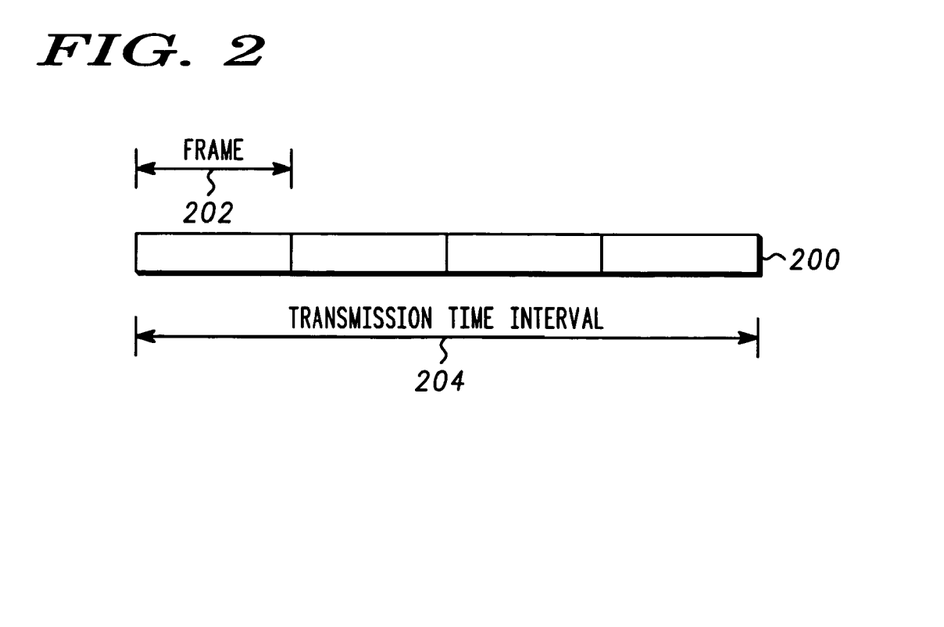
FIG. 2 illustrates a graphical representation of a system frame and a transmission time interval.

FIG. 2 illustrates a graphical representation of a portion of a plurality of system frames 200 designated by a single frame 202 relative to a transmission time interval 204. In the embodiment displayed in FIG. 2, the transmission time interval 204 has a length of four times the frame 202. Although, as recognized by one having ordinary skill in the art, the ratio of the transmission time interval 204 to the frame 200 may be any suitable number as defined by a frame 202 in accordance with standard transmission timing, such as a ten millisecond frame.

Figure 3:
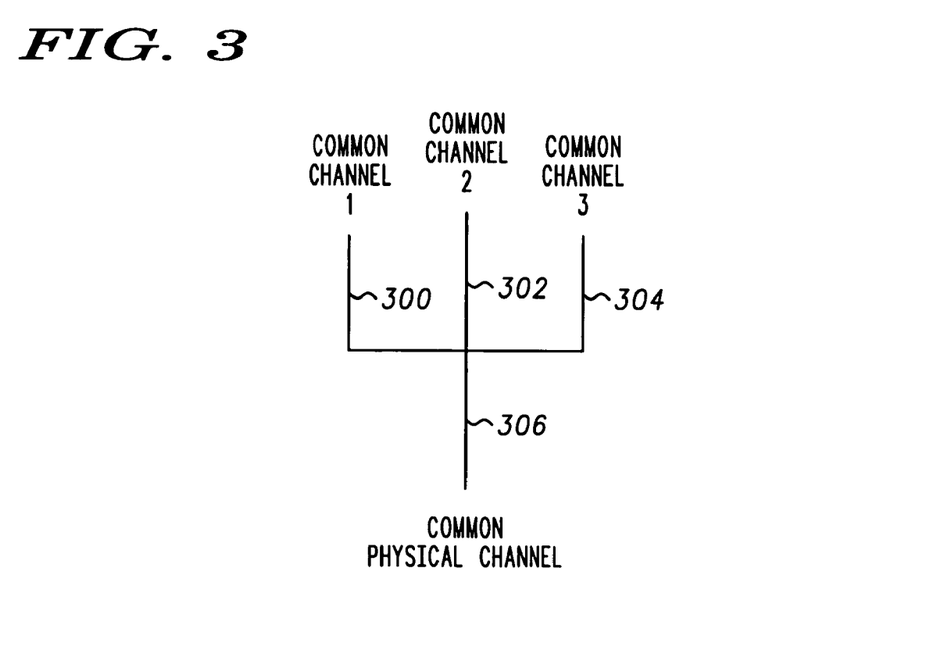
FIG. 3 illustrates a graphical representation of an example of a plurality of common channels mapped onto a common physical channel.

FIG. 3 illustrates the mapping of multiple common channels 300, 302 and 304 to a single common physical channel 306, such as an SCCPCH (Secondary Common Control Physical Channel) of a UMTS system. The common channels 300, 302 and 304 may be conventional common data channels, such as a FACH, for carrying non-multicast data or may be multicast common channels, such as a multicast FACH, for carrying multicast data. Therefore, with respect to FIG. 1, the receiver 102 may receive the common physical channel 306 and the common data channel selector 106 determines the largest common transmission time interval 122 from the three common channels 300, 302 and 304. As recognized by one having ordinary skill in the art, FIG. 3 illustrates a mapping of three common channels to a common physical channel 306, although any suitable number of common channels may be mapped thereon.

Figure 4:
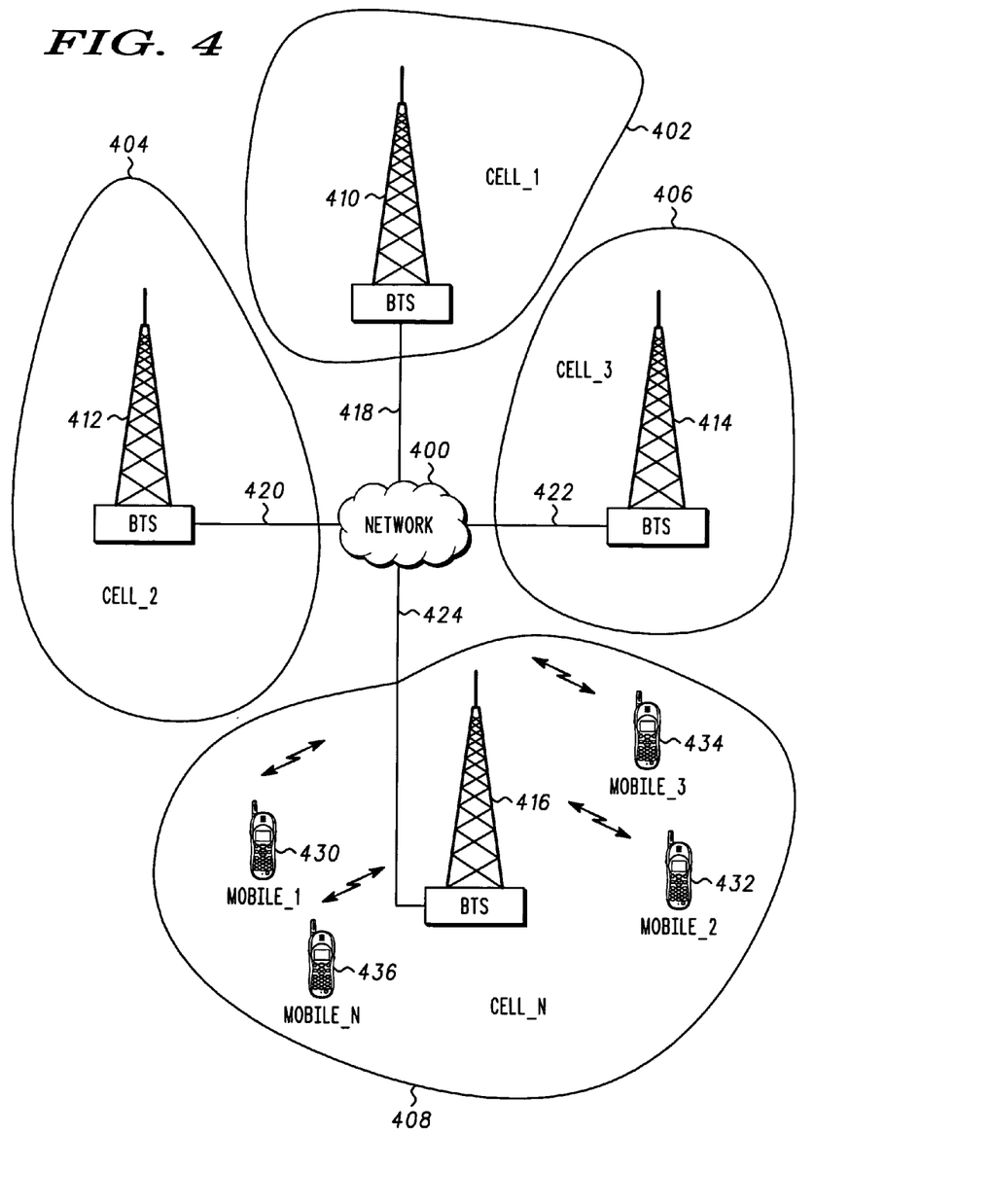
FIG. 4 illustrates a graphical representation of an example of a plurality of mobile cells relative to a network.

FIG. 4 generally illustrates a network 400 in communication with a plurality of cells 402, 404, 406 and 408. As understood by one having ordinary skill in the art, the cells 402, 404, 406 and 408 designate a geographic area where mobile devices can perform wireless communication between corresponding base stations 410, 412, 414 and 416 respectively. In a typical embodiment, the network 400 communicates with the base stations 410, 412, 414 and 416 via a communication link 418, 420, 422 and 424, respectively. These communication links 418, 420, 422 and 424 may be a communication link such as, but not limited to, a Ti connection, a wireless connection, or any other suitable communication connection as recognized by one having ordinary skill in the art.

The representative cell N 408 is shown with a greater level of detail having a plurality of mobile devices 430, 432, 434 and 436. Each of these mobile devices, in one embodiment, correlate to the mobile device 100 of FIG. 1 for communicating with the base station 416. The network 400 may provide conventional common data channel data and multicast data across different common channels within a common physical channel to the mobile devices 430, 432, 434 and 436 within the designated cell 408. In coordination with the mobile device interrupting reception of a multicast signal, the network 400 also performs corresponding functionality for the interruption of the transmission of the multicast signal on the multicast channel.

The functionality of the network 400 may be performed by one or more processors executing program instructions, applications specific integrated circuits, digital signal processors, microprocessors, firmware, micro-controllers, state machines, or any other recognized operational components capable of executing program instructions wherein the programming instructions may be disposed on a ROM, RAM, EEPROM, compact disk, digital versatile disk, optical medium, or any other volatile or non-volatile storage medium.

Figure 5:
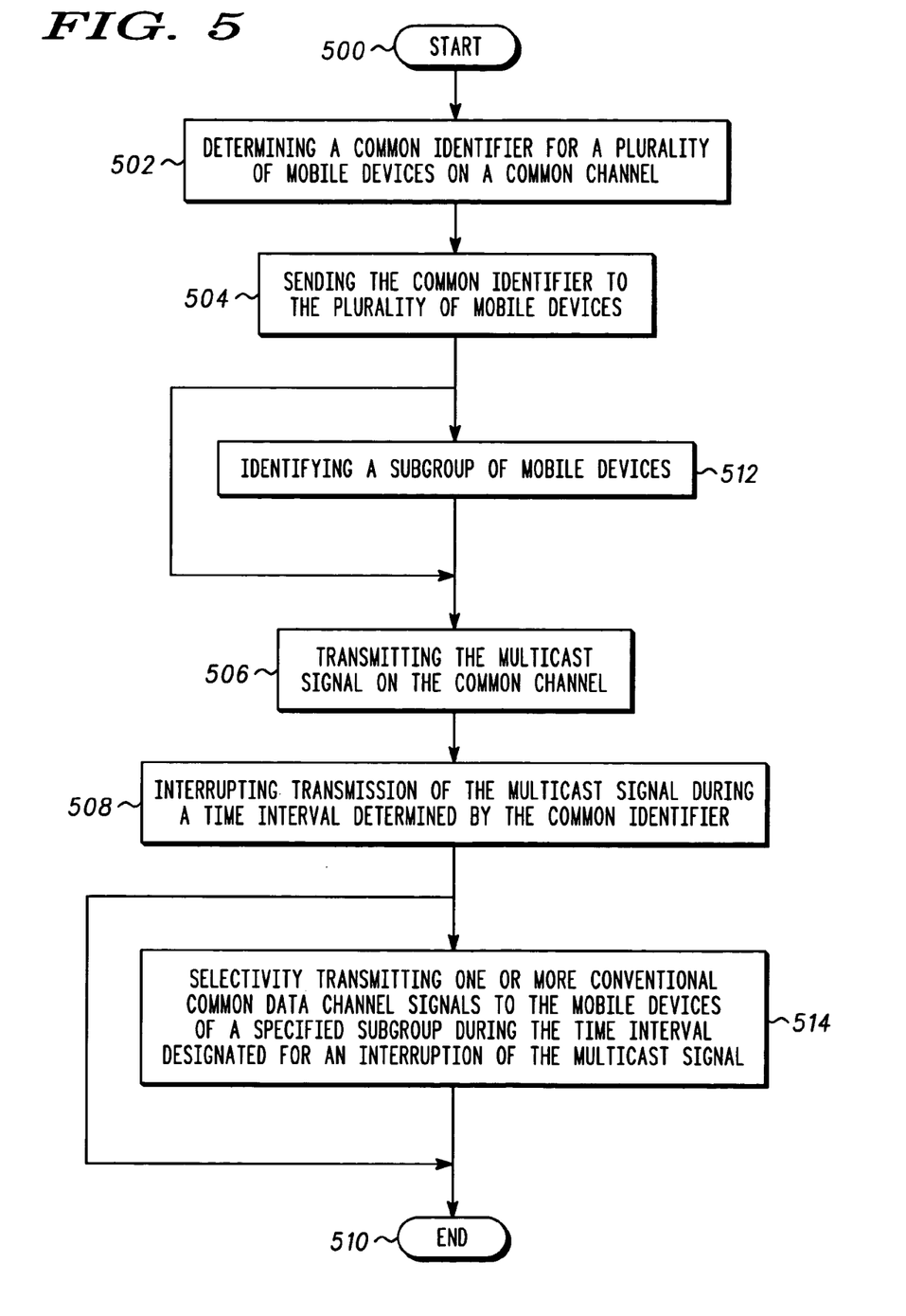
FIG. 5 illustrates a flowchart of a method for interrupting a transmission of a multicast signal according to an embodiment.

In one embodiment, the network 400 of FIG. 4 performs the operations defined by the steps of the flowchart of FIG. 5. The method for interrupting transmission of a multicast signal 500 includes determining a common identifier for a plurality of mobile devices on a common channel, step 502. A common identifier may be a radio network temporary ID specific to a multicast transmission or may be any other suitable identifier recognized by one having ordinary skill in the art. In one embodiment, the common identifier may be a single common identifier for a plurality of multicast services, such as different multicast transmissions or different services. Whereas, in another embodiment, the common identifier may be restricted to a single multicast service such that if there are a plurality of multicast services, this would necessitate a plurality of common identifiers.

The next step, step 504 is sending the common identifier to the plurality of mobile devices. With respect to FIG. 4, the common identifier may be transmitted from the network 400 to the base station 416 such that it is provided to the mobile devices 430, 432, 434 and 436 via wireless transmissions. In one embodiment, the common identifier may be provided to the mobile device through a system broadcast, where the system broadcast is any suitable broadcast including system information or other means for providing information to the mobile. In another embodiment, the common identifier may be provided to the mobile device through a dedicated message addressed to the mobile device. The common identifier may be a multicast radio network temporary identifier, which is specific to the multicast transmission and temporary for the duration of the multicast transmission.

The next step is transmitting the multicast signal on a common channel, step 506. As discussed above with regard to FIG. 3, the common channel 300, 302 or 304 may be mapped onto a common physical channel 306 that contains multicast information thereon. In one embodiment, the multicast signal may be transmitted on one of a plurality of common channels monitored by multiple communication devices. Thereupon, step 508 is interrupting transmission of the multicast signal during a time interval determined by the common identifier. Similar to the above discussion regarding the system frame number comparator of FIG. 1 determining the time interval for a measurement occasion, the time interval may be determined using the largest common channel transmission time interval, a repetition factor, k, and the common ID. Thereupon, the method is complete, step 510.

In another embodiment, the method further includes the identification of a subgroup of mobile devices from the multiple mobiles device, such as illustrated in step 512 representing another embodiment of the method of FIG. 5. For example, using FIG. 4 as a reference, the mobiles 430, 432, 434 and 436 may be further grouped into subgroups, such as the mobile devices 430, 432 in group A and the mobile devices 434, 436 in group B. The mobile devices may be grouped using a mobile specific identifier, which as recognized by one having ordinary skill in the art is assigned to the mobile device when it accesses the common channel state. In one embodiment, the mobile specific identifier is a cell radio network temporary identifier (C_RNTI).

The method further includes selectively transmitting one or more conventional common data channel signals to the mobile devices of a specified subgroup during the time interval designated for an interruption of the multicast signal, such as illustrated in step 514 representing another embodiment of the method of FIG. 5. In one embodiment, the conventional common data channel signal and the common multicast channel signal are mapped onto a common physical channel, such as illustrated in FIG. 3. Whereas, in another embodiment, the conventional common data channel signal and the common multicast channel signal are mapped onto different common physical channels.

In one embodiment, the mobile specific identifier may be used to identify a particular mobile device within a coverage area. In the embodiment where the mobile specific identifier is a C_RNTI, the mobile specific identifier may identify mobile devices within a particular cell. In this embodiment, the mobile specific identifier is assigned when the mobile enters the common channel state, and is associated with a particular cell. Furthermore, the mobile specific identifier may identify a particular mobile device in a radio coverage area, such as a UTRAN registration area.

Figure 6:
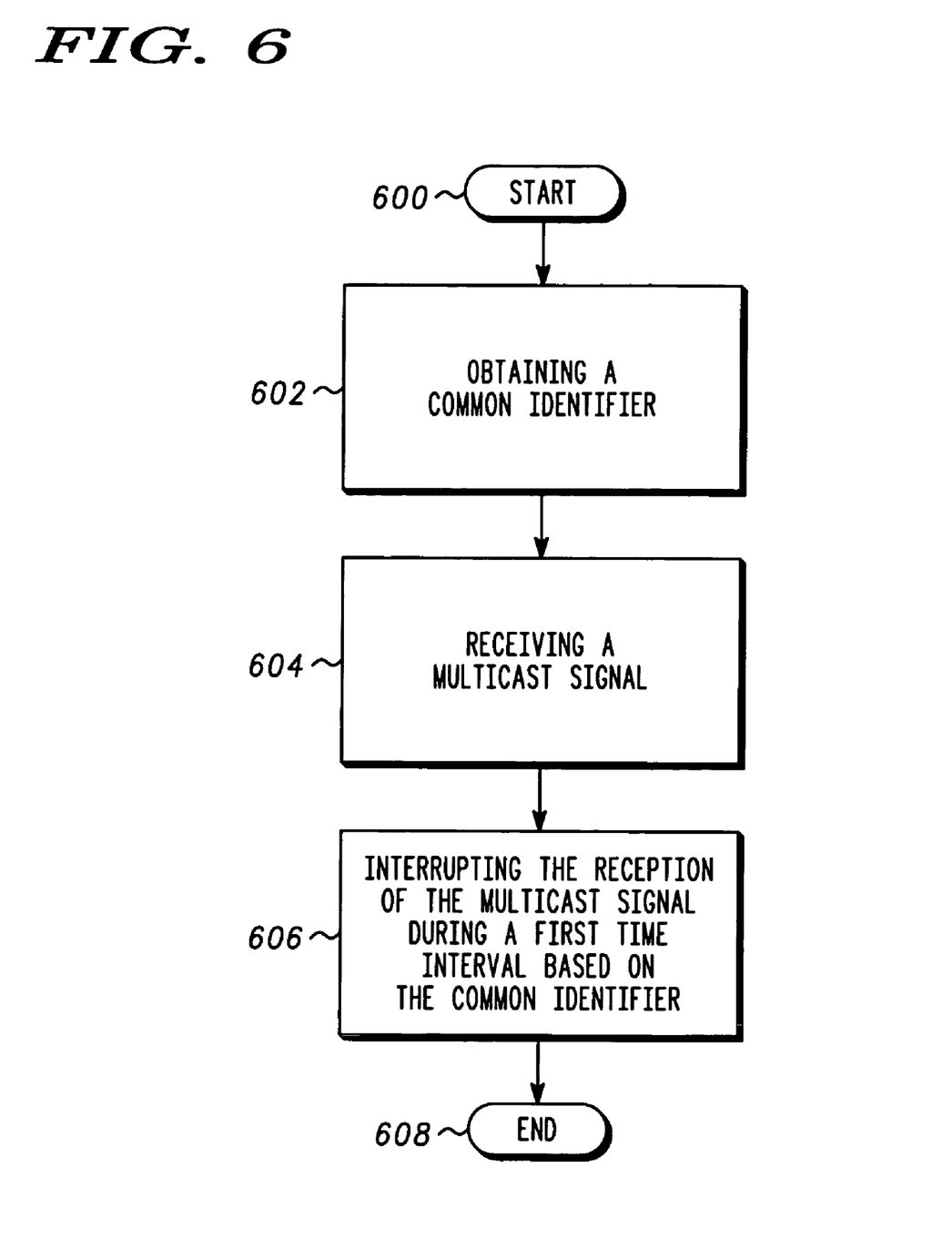
FIG. 6 illustrates a flowchart of a method for interrupting the reception of a multicast signal according to an embodiment.

FIG. 6 illustrates a flowchart of the steps for a method of interrupting a reception of a multicast signal in a wireless communication device. The method begins, step 600, by obtaining a common identifier, step 602. As discussed above with respect to FIG. 1, the common identifier may be a temporary identifier provided by the network. In one embodiment, the common identifier may be obtained through a broadcast message. In another embodiment, the common identifier may be obtained through a dedicated message addressed to the wireless communication device.

The next step, step 604 is receiving a multicast signal. The multicast signal may be provided on the common multicast channel, wherein the multicast signal may include multicast broadcast information. Thereupon, the next step is interrupting the reception of the multicast signal during a first time interval based on the common identifier, step 606. As such, the method is complete, step 608.

As discussed above with regard to FIG. 1, the system frame number comparator 110 determines the timing of a measurement occasion based on the largest common channel transmission time interval 122, the repetition factor 120 and the common ID 124. When the channel measurement occasion may occur, the reception of the multicast signal is interrupted such that the channel measurement occasion may be performed. It is also noted that the term interrupting herein may further include simply receiving no information on a common multicast channel in the event that a multicast signal is not currently being transmitted. Moreover, the time interval may be determined by a repetition factor assigned to the wireless communication device, wherein the repetition factor is determined based on common channel information.

In one embodiment, the method of FIG. 6 further includes performing a measurement occasion during the time interval. Because the reception of the multicast signal has been interrupted, the mobile device may make the appropriate measurement occasion during the time interval without any data loss. Although, as discussed in further detail below, if there exists a timing difference between the multicast frame period and the conventional common channel frame period, the mobile device may receive a conventional channel transmission during a portion of the time interval.

In another embodiment of the steps of FIG. 6, the method for interrupting a reception of a multicast signal may further include obtaining a mobile specific identifier. As discussed above with regards to FIG. 5, the mobile specific identifier may be a C_RNTI. Thereupon, the method includes interrupting the reception of a conventional common data channel signal during a second time interval based on the mobile specific identifier. Similar to the interruption of the multicast transmission, the conventional common data channel signal may be interrupted so that a measurement occasion may occur. Although, as discussed in greater detail below, due to differences between the first time interval and the second time interval, the mobile device may receive a conventional common data channel signal during a portion of the first time interval excluding the time of the second time interval.

Figure 7:
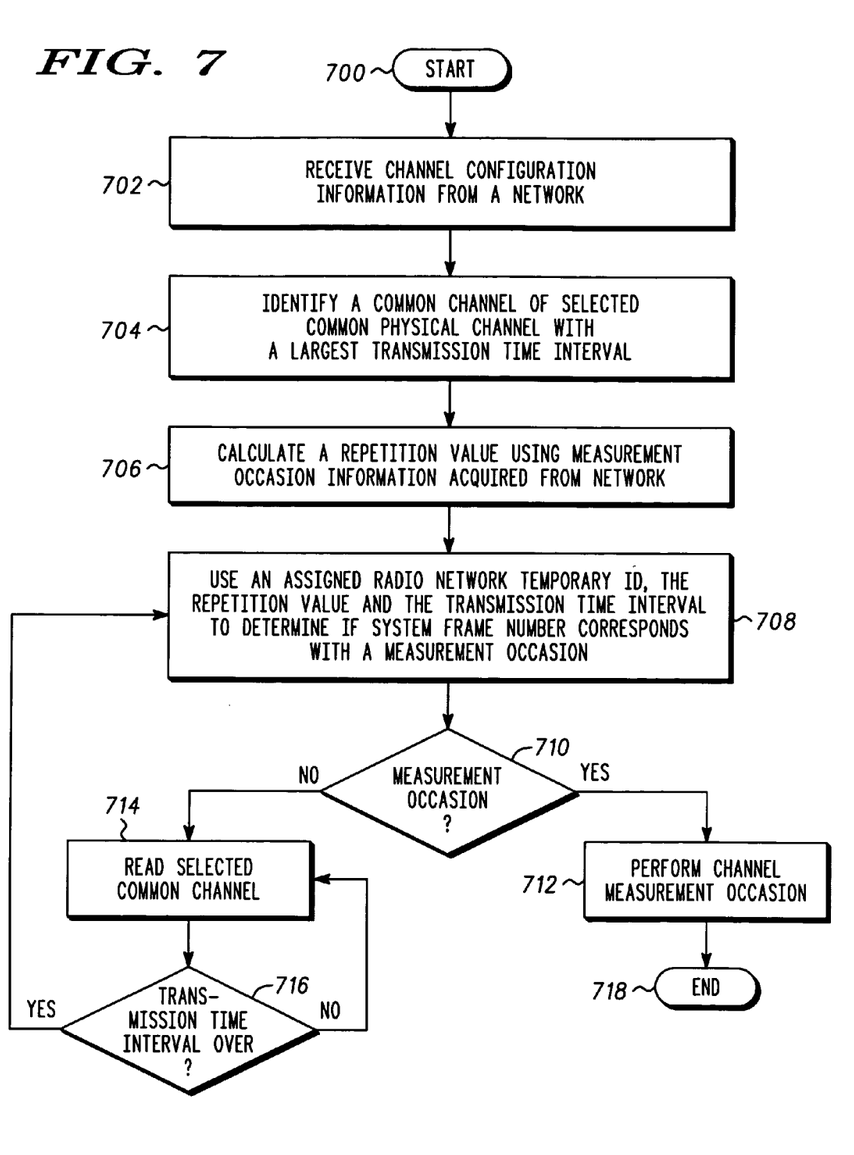
FIG. 7 illustrates a flowchart of a method for interrupting a transmission of a multicast signal according to another embodiment.

FIG. 7 illustrates another embodiment of a method for interrupting transmission of a multicast signal. The method begins, step 700 by receiving channel configuration from a network, step 702. For example, as illustrated with respect to FIG. 4, the network 400 provides channel configuration information across connection 424 to the base station 416. The next step, step 704, is identifying a common channel of a selected common physical channel with a largest transmission time interval. Similar to the functions performed by the mobile device 100, the largest common channel transmission time interval 122 is determined by the common channel selector 106. The next step, step 706, is calculating a repetition value using measurement occasion information acquired from the network, wherein similar to the embodiment discussed with respect to FIG. 1, the measurement occasion information 118 may be provided from the common channel selector 106.

The next step is using an assigned radio network temporary ID, the repetition value and the transmission time interval, to make a determination if a system frame number corresponds with a measurement occasion, step 708. Therefore, step 710, a decision is made if a measurement occasion may occur with respect to a system frame number, step 710. If a measurement occasion may occur, the next step is to perform a channel measurement occasion, step 712. In the event a measurement occasion cannot occur, the method proceeds to step 714 including reading the selected common channel. In one embodiment, the common channel includes the conventional common data channel, which carries non-multicast data and may also include the multicast channel including multicast data.

The next step, step 716, is a determination if the transmission time interval is over. If the transmission time interval is not over, the method reverts back to step 714 for reading the selected common channel. If the transmission time interval is over, the method proceeds to step 708. Therefore, the mobile device uses the assigned radio network ID and makes another determination if the system frame number corresponds with a measurement occasion. Thereupon, the method repeats through decision step 710 until the measurement occasion may be performed, step 712 and thereupon the method is complete, step 718. In another embodiment, the mobile uses the repetition factor and the current system frame number and largest transmission time interval, to determine the start of the next transmission interruption time interval.

Figure 8:
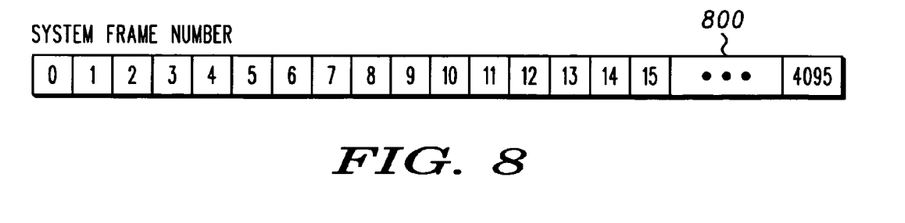
FIG. 8 illustrates a graphical representation of an example of a plurality of system frames.

FIG. 8 illustrates a graphical representation of a system frame number 800 of various system frames. In one embodiment, a timing sequence is composed of 4096 frames numbered 0-4095.

Figure 9:
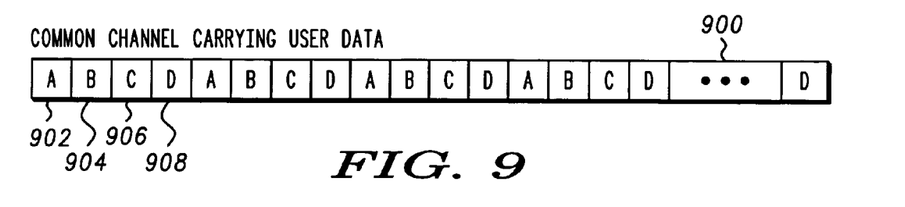
FIG. 9 illustrates a graphical representation of an example of a plurality of system frames of a common channel carrying user data assigned to sub-groupings.

For reference with FIG. 8, FIG. 9 illustrates a common channel carrying user data in the multiple system frames 900. The system frames 900 show conventional common data channel data frame units having an interval of one system frame. Further illustrated in the system frames 900 of FIG. 9 are identifiers for four separate sub-groups of mobile devices, specifically sub-group A 902, sub-group B 904, sub-group C 906 and sub-group D 908. As recognized by one having ordinary skill in the art, there may be any number of various sub-groups and the selection of sub-groups 902, 904, 906 and 908 shown are for exemplary purposes and not designated as being limiting herein.

Figure 10:
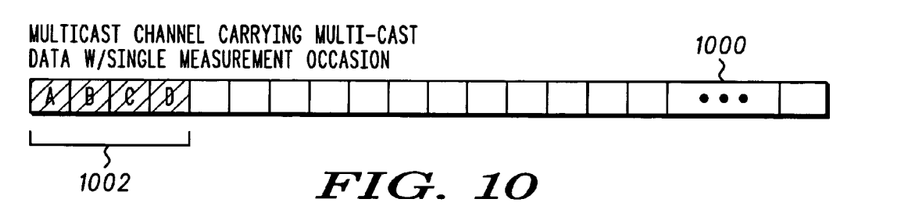
FIG. 10 illustrates a graphical representation of an example of a multicast channel carrying multicast data illustrating a single time interval of interruption of the multicast transmission.

FIG. 10 illustrates a graphical representation of multicast data frames 1000 with a multicast data time interval 1002, which encompasses four system frames, thereby incorporating an interval in which all of the sub-groups A-D, 902, 904, 906 and 908, respectively, are associated. As discussed above, FIG. 10 illustrates one exemplary embodiment of a multicast channel carrying multicast data with a single time interval for interruption of transmission, wherein the time interval occurs over a four frame interval. As recognized by one having ordinary skill in the art, any other suitable time interval may be utilized for the multicast data.

Figure 11:
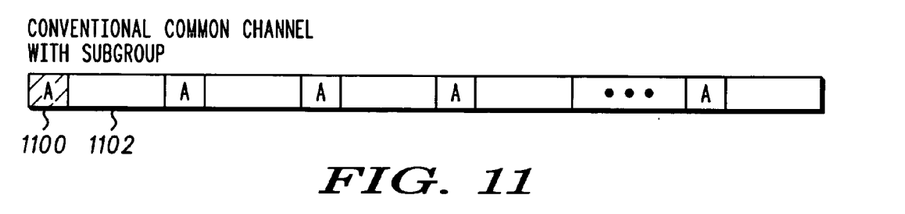
FIG. 11 illustrates a graphical representation of an example of a conventional common data channel with a single sub-group designated for performing a measurement occasion.

FIG. 11 illustrates a graphical representation of a conventional common data channel with a single sub-group, group A. The method and apparatus for interruption of transmission of a multicast signal provides for a mobile device to set its measurement occasion according to the time intervals of transmission interruption for the multicast channel, because the multicast channel has, in this exemplary embodiment, a timing interval that is four times longer. Although, as represented in FIG. 11, when a mobile device in group A performs a measurement occasion which occurs for a single frame interval 1100, the time interval 1102 is unoccupied. Therefore, the mobile device performs the measurement occasion during interval A 1100 and reads any available conventional common data channels during the interval 1102. Therefore, transmission bandwidth and system availability is not wasted during the three system frames 1102 in which the multicast channel is interrupted for measurement occasions, wherein group A performs its measurement occasion during frame 1100.

Figure 12:
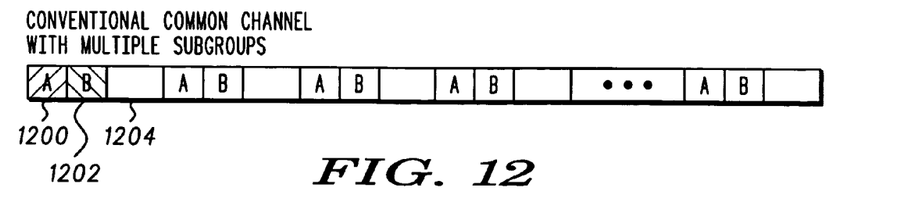
FIG. 12 illustrates a graphical representation of an example of a conventional common data channel with multiple subgroups capable of performing measurement occasions.

FIG. 12 illustrates another embodiment wherein mobile devices may be grouped into two sub-groups, sub-group A 1200 and sub-group B 1202. Similar to the operations illustrated in FIG. 11, group A coordinates its measurement occasions with respect to frames 1002 of FIG. 10 but also reads communication data on available conventional common data channels during the time intervals designated by 1202 and 1204, similar to interval 1102 of FIG. 11.

Furthermore, mobile devices in group B 1202 have a multicast time interval 1002 of FIG. 10 but only need to perform the measurement occasion during the time frame designated 1202. Therefore, mobile devices in group B 1202 may read data from the available conventional common data channels during the time designated 1200 and 1204. As such, when multiple mobile devices are associated with different sub-groups, the active reading of conventional common data channels during intervals when the multicast channel has been interrupted allows for more efficient usage of available conventional common data channel bandwidth.

It should be understood there exists implementations of other variations and modifications of the invention and its various aspects, as may be readily apparent to those of ordinary skill in the art and that the invention is not limited by the specific embodiments described herein. For example, the number of sub-groups for mobile devices may be any suitable number allowing for the efficient utilization and allocation of resources to maintain an efficient utilization of bandwidth on a common physical channel. It is therefore contemplated and covered by the present invention, any and all modifications, variations, or equivalents that fall within the scope of the basic underlying principles disclosed and claimed herein.

What is claimed is:

1. A method for interrupting a transmission of a multicast signal, the method comprising:
   determining a common identifier for a plurality of mobile devices on a common channel;
   sending the common identifier to the plurality of mobile devices;
   transmitting the multicast signal on the common channel;
   interrupting transmission of the multicast signal during a time interval determined by the common identifier;
   identifying a subgroup of mobile devices from the plurality of mobile devices using at least one mobile specific identifier;
   selectively transmitting at least one conventional common data channel signal to the subgroup of mobile devices during the time interval; and
   assigning a transmission interruption time interval repetition factor to one of the plurality of mobile devices based on the mobile specific identifier.

2. The method of claim 1 wherein the conventional common data channel signal and the multicast signal are mapped onto a common physical channel.

3. The method of claim 1 wherein the conventional common data channel signal and the multicast signal are mapped onto different physical channels.

4. The method of claim 1 wherein the step of identifying a subgroup includes:
   using a mobile specific identifier to identify one of the plurality of mobile devices in a cell.

5. The method of claim 1 where the step of identifying a subgroup includes:
   using a mobile specific identifier to identify one of the plurality of mobile devices in a radio coverage area.

6. The method of claim 5 wherein the radio coverage area is a UTRAN registration area.

7. The method of claim 1 further comprising:
   transmitting the transmission interruption time interval repetition factor to the one of the plurality of mobile devices.

8. The method of claim 1 wherein the step of transmitting further includes:
   transmitting the multicast signal on at least one of a plurality of common channels monitored by the plurality of mobile communication devices.

9. The method of claim 1 wherein the step of sending the common identifier includes:
   providing the common identifier to the plurality of mobile devices through a system broadcast.

10. The method of claim 1 wherein the step of sending the common identifier includes:

providing the common identifier to a first mobile device of the plurality of mobile devices through a dedicated message addressed to the first mobile device.

11. The method of claim 1 wherein the common identifier is a multicast radio network temporary identifier.

12. The method of claim 1 wherein the step of determining includes:

assigning a single common identifier for a plurality of multicast services.

13. The method of claim 1 wherein the step of determining includes:

assigning a different common identifier for each multicast service.

* * * * *